(12) United States Patent
Perarnau Ramos et al.

(10) Patent No.: US 7,841,648 B2
(45) Date of Patent: Nov. 30, 2010

(54) SUPPORT CROSSBEAM FOR AN INSTRUMENT PANEL

(75) Inventors: Francesc Perarnau Ramos, Santpedor (ES); Rafa Saez de Ramon, Santpedor (ES); Albert Mas Burillo, Santpedor (ES); Oscar Iñigo Griera, Barcelona (ES); Angel Iñigo, Castellvi de Rosanes (ES)

(73) Assignee: Autotech Engineering A.I.E., Abadiano (ES)

( * ) Notice: Subject to any disclaimer, the term of this patent is extended or adjusted under 35 U.S.C. 154(b) by 723 days.

(21) Appl. No.: 10/594,166

(22) PCT Filed: Mar. 26, 2004

(86) PCT No.: PCT/ES2004/000134

§ 371 (c)(1), (2), (4) Date: Aug. 6, 2007

(87) PCT Pub. No.: WO2005/092695

PCT Pub. Date: Oct. 6, 2005

(65) Prior Publication Data

US 2008/0067835 A1  Mar. 20, 2008

(51) Int. Cl.
B62D 25/14 (2006.01)

(52) U.S. Cl. ................................. 296/193.02
(58) Field of Classification Search ............ 296/193.02, 296/70, 72, 192; 180/90
See application file for complete search history.

(56) References Cited

U.S. PATENT DOCUMENTS

| | | | |
|---|---|---|---|
| 5,311,960 A | 5/1994 | Kukainis et al. | |
| 5,934,744 A | 8/1999 | Jergens et al. | |
| 6,276,739 B1 | 8/2001 | Wich | |
| 6,296,303 B1 * | 10/2001 | Kamiya et al. | 296/70 |
| 6,422,633 B2 * | 7/2002 | Neuss et al. | 296/70 |
| 6,488,330 B2 * | 12/2002 | Hedderly | 296/192 |
| 6,502,897 B2 * | 1/2003 | Neuss et al. | 296/208 |
| 6,641,195 B2 * | 11/2003 | Shikata et al. | 296/70 |
| 6,647,041 B1 * | 11/2003 | Verma et al. | 372/45.01 |

(Continued)

FOREIGN PATENT DOCUMENTS

DE 197 15 069 A1 10/1997

(Continued)

OTHER PUBLICATIONS

International Search Report for PCT Application No. PCT/ES2004/000134 mailed Sep. 23, 2004.

*Primary Examiner*—H Gutman
(74) *Attorney, Agent, or Firm*—RatnerPrestia

(57) ABSTRACT

The invention relates to a support crossbeam for an instrument panel to be assembled between two side elements of a frame of an automotive vehicle next to a front part of an interior. The crossbeam integrates several anchoring and supporting configurations for the steering column, several airbags, fuse boxes, ventilation system elements, sound equipment, among others, and is obtained by pressure die-casting of a light metal alloy, such a magnesium alloy, in an elongated single part extending between first and second ends. This single part has an open cross-section general profile, adapted to be demolded in a transverse direction of the crossbeam, with at least one tubular portion with a cross-section closed in at least one of said first or second ends, adapted to be demolded in the longitudinal direction of the crossbeam.

15 Claims, 3 Drawing Sheets

U.S. PATENT DOCUMENTS

| | | | |
|---|---|---|---|
| 6,705,671 B1 * | 3/2004 | Glovatsky et al. | 296/193.02 |
| 6,921,127 B2 * | 7/2005 | Feith et al. | 296/193.02 |
| 6,955,394 B1 * | 10/2005 | Reddig et al. | 296/208 |
| 7,152,295 B2 * | 12/2006 | Goetz et al. | 29/434 |
| 7,370,500 B2 * | 5/2008 | Kapteyn | 70/237 |
| 2002/0105204 A1 | 8/2002 | Scheidel | |
| 2004/0262954 A1 * | 12/2004 | Scheib et al. | 296/193.02 |
| 2005/0001450 A1 * | 1/2005 | Cooper et al. | 296/193.02 |
| 2005/0134090 A1 * | 6/2005 | Kring et al. | 296/193.02 |
| 2006/0017309 A1 * | 1/2006 | Wolf | 296/193.02 |
| 2008/0048470 A1 * | 2/2008 | Vican | 296/193.02 |
| 2008/0054682 A1 * | 3/2008 | Ellison et al. | 296/193.02 |

FOREIGN PATENT DOCUMENTS

| | | |
|---|---|---|
| DE | 100 29 813 A1 | 1/2002 |
| DE | 100 57 181 A1 | 5/2002 |

* cited by examiner

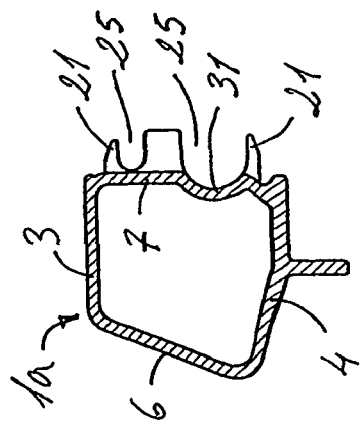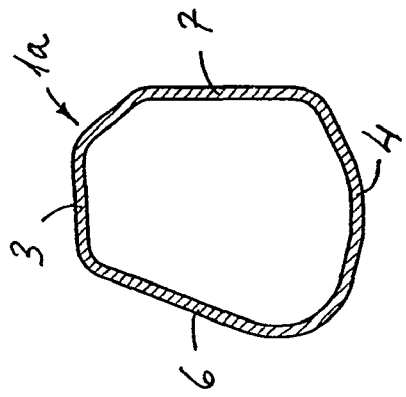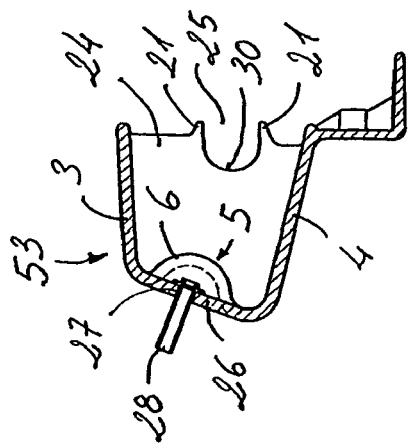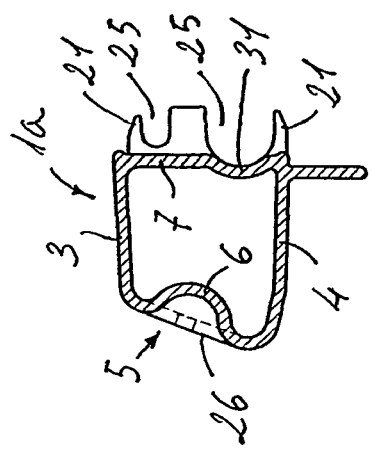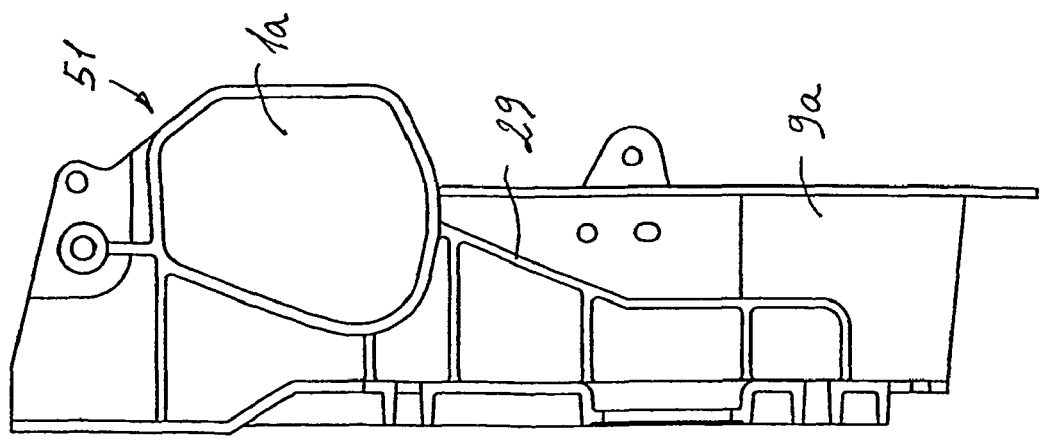

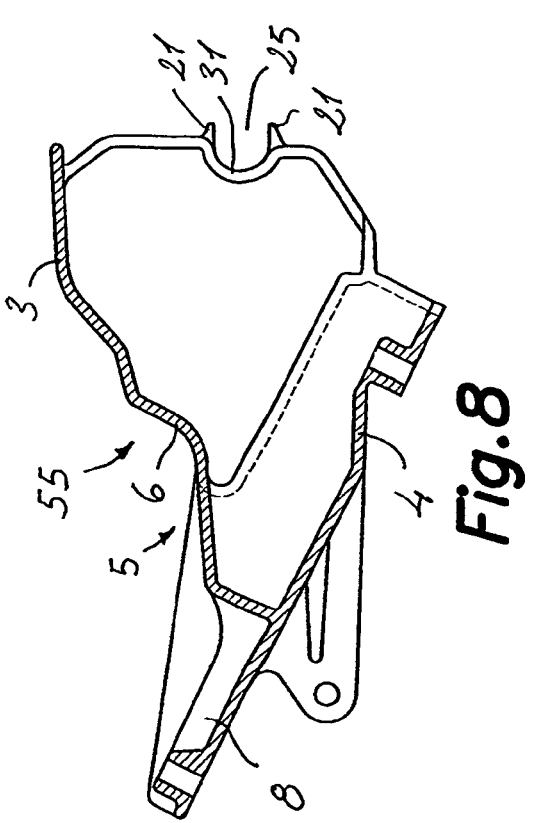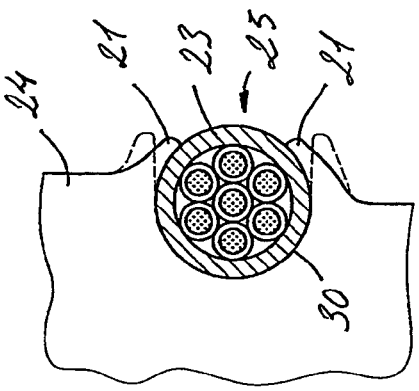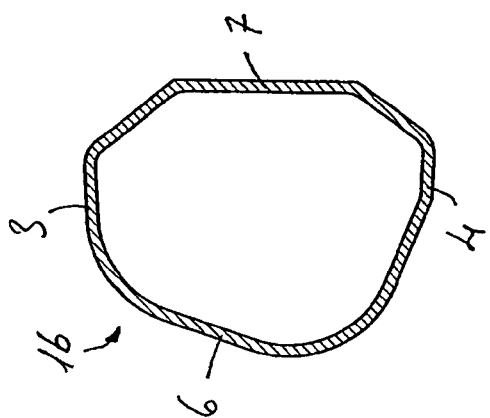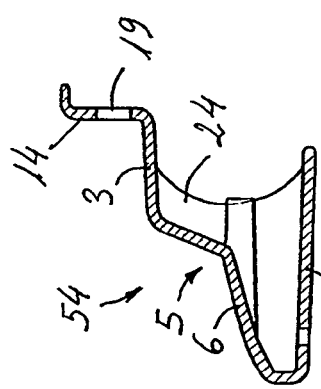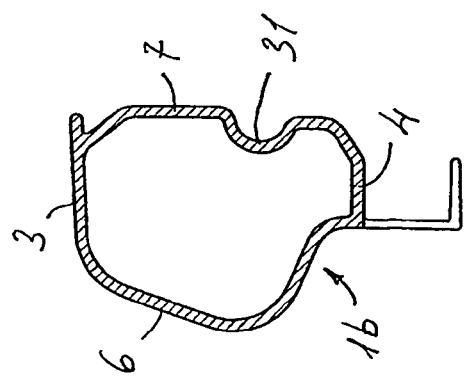

SUPPORT CROSSBEAM FOR AN INSTRUMENT PANEL

This application is a U.S. National Phase Application of International PCT Application No. PCT/ES2004/000134, filed Mar. 26, 2004.

FIELD OF THE ART

The present invention relates to a crossbeam for an instrument panel of an automotive vehicle obtained by pressure die-casting of a light metal alloy, preferably a magnesium alloy, and integrating most of the configurations for anchoring and supporting different components.

PRIOR ART

Current automotive vehicles have a structural element in the form of a support crossbeam assembled on two side elements or pillars of the frame, next to a front part of the interior. Such crossbeam provides rigidity to the frame and acts as a supporter for several configurations for supporting different elements or components, including the steering column, one or more airbags, the fuse box, the instrument panel, air conditioning ducts, sound equipment etc. Most of these components need electrical connections of power supply and/or signals, such that the crossbeam also has a support function for cables or wiring harnesses.

A classic construction for said crossbeam comprises a steel bar extending from one end to the other of the crossbeam and a plurality of support elements obtained from steel sheet, for example, and joined to said bar by welding. A crossbeam manufactured in this manner is very heavy and also very expensive because it requires separately manufacturing a large number of different support elements, which can sometimes be more than twenty, and the subsequent welding of such elements to the bar.

The manufacture of crossbeams by means of a technique of injection under pressure of a light alloy, such as aluminum or magnesium, is recently being introduced. With this technique, it is possible to form the crossbeam from one or more parts integrating several of the support elements, thus significantly reducing the number of parts to be assembled.

Document DE-A-10057181 describes a crossbeam formed by two parts manufactured in magnesium or magnesium alloy and connected by a joining element. This crossbeam has a slight integration of supporting configurations and other functions. The central body of the crossbeam is formed by more than one element.

Document DE-A-19715069 describes a crossbeam formed by three detachable parts requiring an additional assembly in order to be connected to each other. The three parts are manufactured by pressure molding in a light alloy. The intermediate part has a smaller cross section than that of the adjacent side parts and acts as an energy absorbing element.

Document DE-A-10029813 discloses a crossbeam formed by three elements preferably manufactured in a cast light alloy which are superimposed in a central area in which they are fixed by jeans of screws or welding, thus increasing the weight of the assembly and the assembling steps.

Document U.S. Pat. No. 5,934,744 describes a crossbeam with a sandwich construction formed by three layers made up of plastic parts. The part forming the intermediate layer has a W-shaped cross-section. The part forming the rear layer closes the open ends of the intermediate part and can be used as ventilation passages. Its drawback is that the adjustment between the three parts is difficult and it has a high weight.

Document U.S. Pat. No. 5,311,960 refers to the assembly of a multifunctional crossbeam manufactured by pressure die-casting from magnesium without providing significant novelties to the design of the crossbeam or to its function.

Crossbeams obtained from a single cast part having a profile with an open cross-section with a plurality of oblique and cross-linked ribbings, which are inconvenient during the casting process because they tend to produce air entrapments and therefore a deficient structural and metallurgic integrity, are also known in the state of the art.

In the cited documents, due to the conditions imposed by the pressure molding technique, the elongated parts forming the crossbeam or parts thereof and incorporating supporting configurations projecting in a transverse direction have an open general transverse direction in order to facilitate the demolding in the transverse direction of the crossbeam.

In the mentioned documents, due to the fact that the mechanical stressing in the ends of the crossbeam are greater than in the middle part, the transverse section of the crossbeam is generally greater in the end portions with the purpose of providing them with a greater resistance.

None of the mentioned documents describes or suggests that the crossbeam obtained by pressure die-casting of a light alloy is formed by a single part with a general profile with an open cross-section with at least one tubular portion with a closed cross-section in at least one of its ends with the purpose of reinforcing said end.

DISCLOSURE OF THE INVENTION

The present invention provides a support crossbeam for an instrument panel, adapted to be assembled between two side elements of a frame of an automotive vehicle next to a front part of an interior, of the type obtained by pressure die-casting of a light metal alloy and integrating several anchoring and supporting configurations. The crossbeam is characterized in that it is formed by a single part with an elongated configuration extending between first and second ends, where said single part comprises a general profile with an open cross-section with at least one tubular portion with a cross-section closed in at least one of said first or second ends.

Preferably, both first and second ends of the crossbeam of the present invention comprise tubular portions with a closed cross-section, where said general profile with an open cross-section is adapted to be demolded in a transverse direction of the crossbeam and said tubular portion or tubular portions with a closed cross-section is(are) adapted to be demolded in the longitudinal direction of the crossbeam.

The mentioned tubular portions with a closed cross-section provide a greater resistance to the end portions of the crossbeam without a significant increase of the size of the cross-section of the end portions or a significant increase in the weight of the crossbeam.

The crossbeam has corresponding first and second anchoring flatbars formed in its first and second ends, which anchoring flatbars extend transversely and are adapted to be fixed respectively to the two side elements of the mentioned frame of the automotive vehicle. These anchoring flatbars have an L-shaped cross-section profile such that they are adapted to be demolded partially in the longitudinal direction of the crossbeam together with the corresponding tubular portions and partially in the transverse direction or general demolding direction of the crossbeam.

The mentioned general profile with an open cross-section comprises one or more portions incorporating a substantially depressed U-shaped cross-section profile which is formed by a connecting wall joined at each of its longitudinal edges to a corresponding longitudinal edge of an adjacent wall, these two adjacent walls being spaced and mutually opposite. Thus, one of said opposite walls is an upper wall, the other one of said opposite walls is a lower wall, and the connecting wall is bottom wall located in the rear part of the crossbeam in relation to the direction of the forward movement of the vehicle. Said bottom wall preferably has a longitudinal groove the ends of which extend at least partly along the tubular portions.

The general profile with an open cross-section comprises several transverse ribbings joined at their upper, lower and rear edges respectively to said upper, lower and rear walls. Said ribbings are generally in a plane substantially perpendicular to the upper, lower and bottom walls and are generally isolated from each other. Pernicious air entrapments which otherwise occur during the manufacture of parts by means of pressure die-casting technology due to the convergence and collision of flows of melted metal inside the mold when the ribbings are oblique and cross-linked are thus prevented. The mutually isolated perpendicular ribbings of the crossbeam of the present invention facilitate the flow of melted metal reducing the risk of air entrapments.

In order to fasten cables, the crossbeam comprises one or more specific configurations located in the front part of the crossbeam, either next to the free edge of one or more of said transverse ribbings or in a front wall of one or both tubular portions. Such configurations comprise appendages delimiting a hollow provided for housing a cable or wiring harness between them. One or both of said appendages are designed to be riveted by pressure or percussion to said cable or wiring harness with the purpose of fastening it firmly to the crossbeam. In order to locate or house said cable or wiring harness at least partially such that it projects as little as possible, said hollow forms part of a notch formed in the transverse ribbings, or forms part of a groove extending along at least part of said front wall of the end tubular portions. In this way, a wiring fixing element is incorporated which prevents the traditional incorporation of fastening elements, such as plastic flanges, through previously machined holes.

By virtue of a special arrangement of the mold parts, the crossbeam of the invention integrates most of the supporting configurations necessary for fixing the components normally associated to the crossbeam, such as the steering column, one or more airbags, the fuse box, the instrument panel, air conditioning ducts etc. Thanks to this, the number of parts forming the assembled crossbeam is drastically reduced.

Thus, for example, the crossbeam integrates two steering column supporting configurations located between a central region and the second end, said two steering column supporting configurations formed by substantially symmetrical projecting transverse mortises defined next to a lower wall of an area having the open cross-section profile. A pair of support legs connected to each other by a crossbeam and adapted to be fixed at their ends to a lower element of said frame of the vehicle, extend transversely from said central region. Other supporting configurations also integrated in the crossbeam will be described below.

The crossbeam of the invention comprises, as usual, a number of through holes. In the crossbeams of the state of the art, such through holes are performed by machining. However, given that the machining of magnesium parts is associated to a high risk of ignition of the chips, in the crossbeam of the present invention most of the through holes have been designed such that they can be directly obtained in the pressure die-casting operation, the through holes being oriented to that end either in the mentioned longitudinal demolding direction of the crossbeam in those areas where the open cross-section profile exists, or in the transverse demolding direction in the tubular ends. Some of the through holes have been changed from their usual position in order to achieve the suitable orientation.

BRIEF DESCRIPTION OF THE DRAWINGS

The previous and other features and advantages of the invention will be more fully understood from the detailed description of an embodiment with reference to the attached drawings in which:

FIG. 2 is a side elevational view taken in the direction of the arrow II of FIG. 1;

FIG. 3 is a cross-sectional view taken by the plane III-III of FIG. 1 in the direction of the arrows;

FIG. 4 is a cross-sectional view taken by the plane IV-IV of FIG. 1 in the direction of the arrows;

FIG. 5 is a cross-sectional view taken by the plane V-V of FIG. 1 in the direction of the arrows;

FIG. 6 is a cross-sectional view taken by the plane VI-VI of FIG. 1 in the direction of the arrows;

FIG. 7 is a cross-sectional view taken by the plane VII-VII of FIG. 1 in the direction of the arrows;

FIG. 8 is a cross-sectional view taken by the plane VIII-VIII of FIG. 1 in the direction of the arrows;

FIG. 9 is a cross-sectional view taken by the plane IX-IX of FIG. 1 in the direction of the arrows;

FIG. 10 is a cross-sectional view taken by the plane X-X of FIG. 1 in the direction of the arrows; and FIG. 11 is a cross-sectional view illustrating the fastening of a cable or wiring harness to the crossbeam by means of a specific configuration.

DETAILED DESCRIPTION OF AN EMBODIMENT

Figure 1:
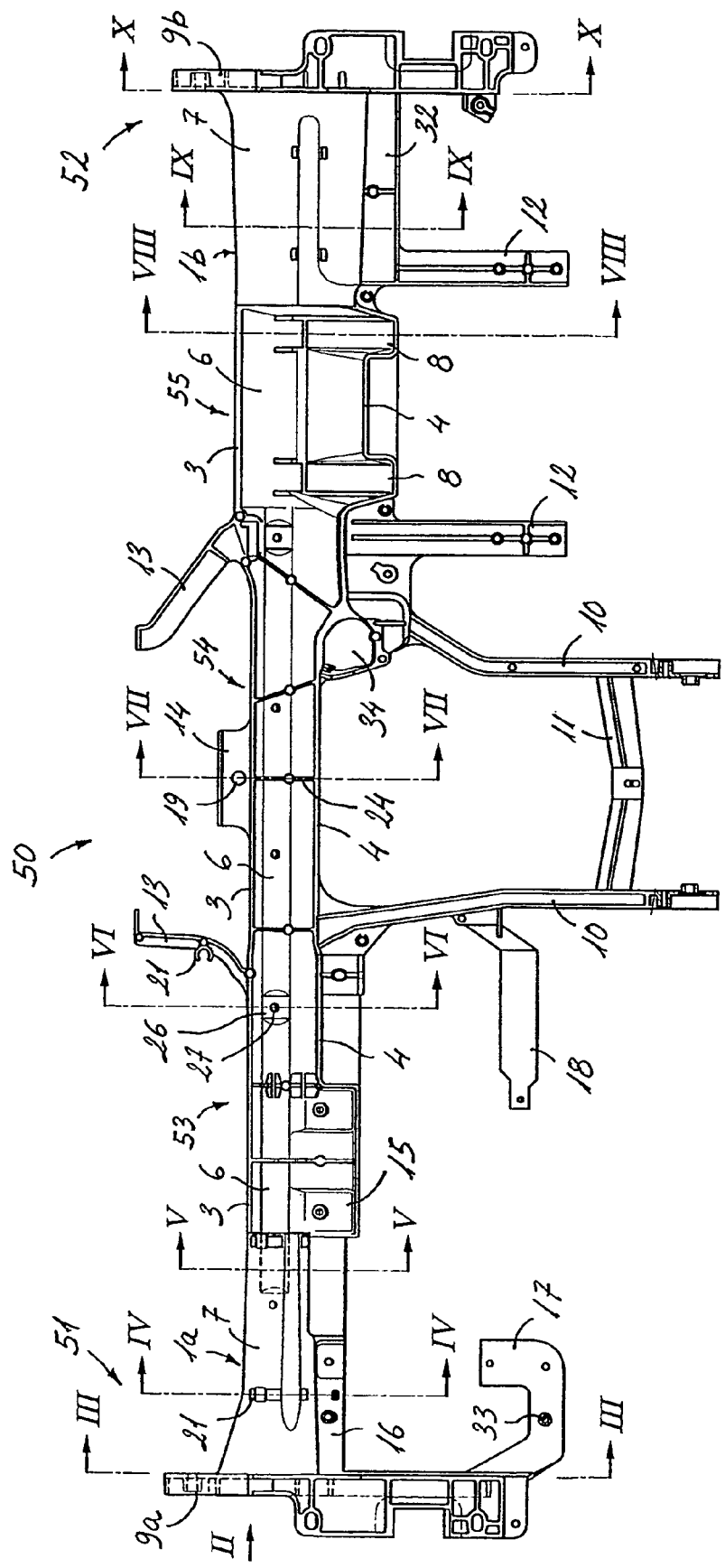
FIG. 1 is a front elevational view of the crossbeam according to an embodiment of the present invention.

With reference to FIG. 1, a crossbeam for an instrument panel according to the present invention is designated by the reference number 50, which crossbeam is adapted to be assembled between two side elements of a frame of an automotive vehicle next to a front part of the interior. The crossbeam 50 is obtained from a single part 50 by pressure die-casting of a light metal alloy, preferably a magnesium alloy, although the invention is not limited to this alloy. The mentioned single part 50 has an elongated configuration and extends between first and second ends 51, 52 formed by respective first and second tubular portions 1a, 1b with a closed cross-section (better shown in FIGS. 3-4 and 9-10 respectively) adapted to be demolded in the longitudinal direction of the crossbeam. Between said first and second tubular portions 1a, 1b with a closed cross-section, the crossbeam 50 has a general profile with an open cross-section adapted to be demolded in a transverse direction of the crossbeam.

In its first and second ends 51, 52 the crossbeam 50 includes corresponding first and second anchoring flatbars 9a, 9b adapted to be fixed respectively to said two side elements of said frame of the automotive vehicle. The mentioned anchoring flatbars 9a, 9b are formed such that they extend transversely and have a substantially L-shaped cross-section profile including several ribbings 29 in different directions (see FIG. 2), so that they are adapted to be demolded partially in the longitudinal direction of the crossbeam, next to the corresponding tubular portions 1a, 1b, and partially in the transverse direction of the crossbeam, next to the general profile portions with an open cross-section.

There are several portions 53, 54, 55 having the mentioned general profile with an open cross-section in different shapes defined between the tubular ends 1a, 1b, such that the profile varies throughout the crossbeam according to the function of each portion 53, 54, 55. As a general feature, the mentioned open cross-section general profile comprises a pair of mutually opposite and spaced walls 3, 4 joined at some of their respective longitudinal edges to corresponding longitudinal edges of a connecting wall 6, such that said opposite walls 3, 4 define, together with said connecting wall 6, a substantially depressed U-shaped cross-section profile. Thus, one of said opposite walls 3 is an upper wall 3, the other one of said opposite walls 4 is a lower wall 4, and the connecting wall 6 is a bottom wall 6 located in the rear part of the crossbeam, in relation to the direction of the forward movement of the vehicle. The tubular portions la, lb further comprise a front wall 7 configuring the profile of a closed cross-section together with the bottom wall 6 and the upper and lower walls 3, 4.

As can be observed better in FIGS. 3 to 10, the mentioned bottom wall 6 has a waviness defining a longitudinal groove 5 the ends of which extend at least partly along the tubular portions 1a, 1b. This waviness or groove 5 acts as reinforcement and in some sections moves the axis of inertia towards the open side of the crossbeam. In some areas (see FIG. 6), the groove 5 is interrupted to provide a planar portion 26 with a hole 27 for the passage of, for example, a screw 28 and an area around said hole which is just wide enough to provide a good seating for the head of said screw 28 or washer associated thereto.

The general profile of an open cross-section comprises several transverse ribbings 24 joined at three of its edges respectively to said upper, lower and bottom walls 3, 4, 6 in a position substantially perpendicular thereto as can be seen in FIG. 6. Said several transverse ribbings 24 are isolated from each other with the aim of facilitating the flow of melted metal and preventing air entrapments. Some of said transverse ribbings 24 comprise (FIG. 6), next to their free edge, appendages 21 delimiting a hollow 25 provided for housing a cable or wiring harness 23 between them. One or both of said appendages 21 are capable of being riveted on the mentioned cable or wiring harness 23 with the aim of fastening it to the crossbeam in said hollow 25. The hollow 25 preferably forms part of a notch 30 formed in the transverse ribbing 24 such that the cable or wiring harness 23 is at least partially located and housed in said notch 30.

FIG. 11 shows the assembly of a wiring harness 23 in the hollow 25 delimited by the notch 30 and a pair of appendages 21 in a transverse ribbing 24. The appendages 21 are shown by dotted lines before the riveting or deformation.

Likewise, in said front wall 7 of one or both tubular portions 1a, 1b, there are arranged rivetable appendages 21, similar to the ones described above, delimiting a hollow 25 provided for housing a cable or wiring harness 23 between them, but here (FIGS. 4 and 5) the mentioned hollow 25 forms part of a groove 31 extending along at least part of said front wall 7 with the purpose of locating and housing said cable or wiring harness 23 at least partially. This arrangement of rivetable appendages 21 for fastening cables or wiring harnesses 23 has the significant advantage of substituting the making of a hole, which prevents the drawbacks associated to the risk of inflammation of the magnesium chips, and the placing of a fastening element such as a plastic flange.

In all the cases in which it has been possible, through holes 19, 20 obtained in the pressure die-casting operation have been provided. To that end, some of said through holes 19 (see FIG. 7 for example) are oriented in said transverse demolding direction of the crossbeam whereas others of said through holes 20 (see FIG. 2 for example) are oriented in said longitudinal demolding direction. To that end, the position of some of the through holes has been modified in order to provide them with a favorable orientation.

The crossbeam of the present invention can integrate virtually all the configurations for supporting different components which would otherwise be separate parts welded or fixed by other means to a base bar. The design of such supporting configurations and the design of the crossbeam are generally directed to facilitate the injection process without relinquishing a greater performance, achieving a reduction in the time necessary for the adjustment of a pressure injection molding process and a reduction in the number of defective parts.

Thus, as shown in FIG. 1, the single-part crossbeam 50 integrates two steering column supporting configurations 8 located between a central region 54 and the second end 52. These steering column supporting configurations 8 are formed by substantially symmetrical transverse mortises defined in said lower wall 4. A pair of support legs 10 transversely extends downwards from said central region 54 and is adapted to be fixed at their free ends to a lower element or tunnel of the frame of the vehicle. A crossbeam 11 connects said support legs 10 to each other and acts as a support for the ventilation equipment. There is a sound equipment supporting configuration 34 in the confluence of one of said support legs 10 with the crossbeam.

The crossbeam 50 also integrates a pair of knee airbag supporting configurations 12 extending transversely downwards from positions adjacent to said two steering column supporting configurations 8, and a pair of upper instrument panel supporting configurations 13 extending transversely upwards and towards each other from the central region 54. A central instrument panel supporting configuration 14 projects above the upper wall 3 in said central region 54, which configuration incorporates a through hole 19 further serving as a reference and centering point of said panel (not shown). Between one of said knee airbag supporting configurations 12 and the second anchoring flatbar 9b, next to the second end 52, there is arranged a fuse box supporting configuration 32 in the form of a rib projecting below said second tubular portion 1b.

Between the central region 54 and the first end 51 of the crossbeam 50, there is a front passenger airbag supporting configuration 15 formed by a mortise extending downwards from the lower wall 4. It also integrates an upper terminal box supporting configuration 16 in the form of a rib projecting below said first tubular portion la next to the first end 51. It also integrates a first ventilation element supporting configuration 17 incorporating a fuse box supporting configuration 33. This first ventilation element supporting configuration 17 extends in the longitudinal direction from the first anchoring flatbar 9a, and a second ventilation element supporting configuration 18, opposite to the first configuration, extends from one of said support legs 10 towards the first end 51 in the longitudinal direction.

Evidently, the crossbeam 50 can integrate other minor supporting configurations, and a person skilled in the art will be able to easily introduce modifications and variations in the described and shown embodiment without departing from the scope of the present invention which is defined by the enclosed claims.

The invention claimed is:

1. A support crossbeam for an instrument panel adapted to be assembled between two side elements of a frame of an automotive vehicle next to a front part of an interior, said support crossbeam being obtained by pressure die-casting of a light metal alloy and integrating several anchoring and supporting configurations, wherein the support crossbeam is formed by a single part having an elongated configuration and extending between first and second ends, said single part comprising a general profile having an open cross-section and first and second tubular portions having a closed cross-section located respectively in said first and second ends, and in that said general profile having said open cross-section includes at least one portion comprising a pair of spaced opposite walls, having respective longitudinal edges joined to corresponding longitudinal edges of a connecting wall, said opposite walls defining, together with said connecting wall, a substantially depressed U-shaped cross-section profile, wherein one of said opposite walls is an upper wall, the other one of said opposite walls is a lower wall, and the connecting wall is a bottom wall, and wherein the general profile having the open cross-section comprises several transverse ribbings, each having three edges respectively joined to said upper, lower and bottom walls in a position substantially perpendicular thereto.

2. The crossbeam according to claim 1, wherein said bottom wall has waviness defining a longitudinal groove the ends of which extend at least partly along the tubular portions.

3. The crossbeam according to claim 1, wherein said bottom wall has waviness defining a longitudinal groove the ends of which extend at least partly along the tubular portions, and in that the groove has at least one interruption to provide a planar portion with a hole for the passage of a fixing element.

4. The crossbeam according to claim 1, wherein at least one of said transverse ribbings comprises, next to a free edge thereof, appendages delimiting a hollow provided for housing a cable or wiring harness between them, at least one of said appendages being able to be riveted on said cable or wiring harness to fasten cable or wiring harness in said hollow.

5. The crossbeam according to claim 1, wherein said hollow forms part of a notch formed in the transverse ribbing, said notch being provided for locating and housing said cable or wiring harness at least partially.

6. The crossbeam according to claim 1, wherein said general profile having the open cross-section is adapted to be demolded in a transverse direction of the crossbeam and said first and second tubular portions having said closed cross-section are adapted to be demolded in the longitudinal direction of the crossbeam.

7. The crossbeam according to claim 6, further comprising at least one through hole obtained in the pressure die-casting operation, said through hole being oriented in said transverse direction of the crossbeam.

8. The crossbeam according to claim 6, further comprising at least one through hole obtained in the pressure die-casting operation, said through hole being oriented in said longitudinal direction of the crossbeam.

9. The crossbeam according to claim 1, wherein corresponding first and second anchoring flatbars are formed in the first and second ends, wherein said anchoring flatbars extend transversely and are adapted to be fixed respectively to said two side elements of said frame of said automotive vehicle.

10. The crossbeam according to claim 9, wherein said anchoring flatbars have a profile with a substantially L-shaped cross-section reinforced with ribbings and are adapted to be demolded partially in the longitudinal direction of the crossbeam, next to the corresponding tubular portions, and partially in the transverse direction of the crossbeam, next to the open cross-section general profile.

11. A support crossbeam for an instrument panel adapted to be assembled between two side elements of a frame of an automotive vehicle next to a front part of an interior, said support crossbeam being obtained by pressure die-casting of a light metal alloy and integrating several anchoring and supporting configurations, wherein the support crossbeam is formed by a single part having an elongated configuration and extending between first and second ends, said single part comprising a general profile having an open cross-section and first and second tubular portions having a closed cross-section located respectively in said first and second ends, and in that said general profile having said open cross-section includes at least one portion comprising a pair of spaced opposite walls, having respective longitudinal edges joined to corresponding longitudinal edges of a connecting wall, said opposite walls defining, together with said connecting wall, a substantially depressed U-shaped cross-section profile, wherein one of said opposite walls is an upper wall, the other one of said opposite walls is a lower wall, and the connecting wall is a bottom wall, and wherein at least one of the tubular portions comprises a front wall having appendages delimiting a hollow between them, provided for housing a cable or wiring harness, at least one of said appendages being able to be riveted on said cable or wiring harness to fasten the cable or wiring harness in said hollow.

12. The crossbeam according to claim 11, wherein said hollow forms part of a groove extending along at least part of said front wall of at least one of the tubular portions, said groove being provided for locating and housing said cable or wiring harness at least partially.

13. A support crossbeam for an instrument panel adapted to be assembled between two side elements of a frame of an automotive vehicle next to a front part of an interior, said support crossbeam being obtained by pressure die-casting of a light metal alloy and integrating several anchoring and supporting configurations, wherein the support crossbeam is formed by a single part having an elongated configuration and extending between first and second ends, said single part comprising a general profile having an open cross-section and first and second tubular portions having a closed cross-section located respectively in said first and second ends, and in that said general profile having said open cross-section includes at least one portion comprising a pair of spaced opposite walls, having respective longitudinal edges joined to corresponding longitudinal edges of a connecting wall, said opposite walls defining, together with said connecting wall, a substantially depressed U-shaped cross-section profile, wherein one of said side walls is an upper wall, the other one of said side walls is a lower wall, and the connecting wall is a bottom wall, and further integrating a pair of support legs extending transversely downwards from a central region, said support legs being connected to each other by a crossbeam and adapted to be fixed at their ends to a lower element of said frame of the vehicle.

14. The crossbeam according to claim 13, further integrating two steering column supporting configurations located between said central region and said second end of the single part, said steering column supporting configurations being formed by substantially symmetrical transverse mortises defined in said lower wall.

15. The crossbeam according to claim 14, further integrating at least one sound equipment supporting configuration; at least one knee airbag supporting configuration; at least one upper instrument panel supporting configuration; at least one central instrument panel supporting configuration; at least one first fuse box supporting configuration; at least one second fuse box supporting configuration; at least one front passenger airbag supporting configuration; at least one upper terminal box supporting configuration; and at least one first and one second ventilation element supporting configurations.

* * * * *